(12) United States Patent
Malagoli et al.

(10) Patent No.: US 7,066,303 B2
(45) Date of Patent: Jun. 27, 2006

(54) BRAKE PISTON

(75) Inventors: Roberto Malagoli, Bergamo (IT); Riccardo Arrigoni, Milan (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/479,591

(22) PCT Filed: Jun. 4, 2001

(86) PCT No.: PCT/IT01/00286

§ 371 (c)(1),
(2), (4) Date: Dec. 4, 2003

(87) PCT Pub. No.: WO02/099305

PCT Pub. Date: Dec. 12, 2002

(65) Prior Publication Data

US 2005/0077123 A1    Apr. 14, 2005

(51) Int. Cl.
*F16D 55/02* (2006.01)
(52) U.S. Cl. .................. 188/71.6; 188/264 A
(58) Field of Classification Search ............. 188/71.4, 188/72.4, 72.5, 71.6, 264 AA, 264 A
See application file for complete search history.

(56) References Cited

U.S. PATENT DOCUMENTS

| 3,112,014 | A |   | 11/1963 | Jeffries |
| 3,675,742 | A | * | 7/1972 | Thompson .................. 188/72.5 |
| 4,572,334 | A | * | 2/1986 | Villata ......................... 188/71.6 |
| 4,581,985 | A | * | 4/1986 | Villata ......................... 92/248 |
| 5,031,511 | A | * | 7/1991 | Villata ......................... 92/128 |
| 5,782,323 | A |   | 7/1998 | Mills |
| 6,347,689 | B1 | * | 2/2002 | Ohishi ......................... 188/72.4 |
| 6,401,882 | B1 | * | 6/2002 | Ueda et al. ............. 188/264 G |

FOREIGN PATENT DOCUMENTS

DE    39 06 827 A1    9/1990

\* cited by examiner

*Primary Examiner*—Devon C. Kramer
(74) *Attorney, Agent, or Firm*—Hogan&Hartson LLP

(57) ABSTRACT

The present invention relates to a brake piston with reduced transmission of heat from the disk to the brake fluid.

Figure 1:
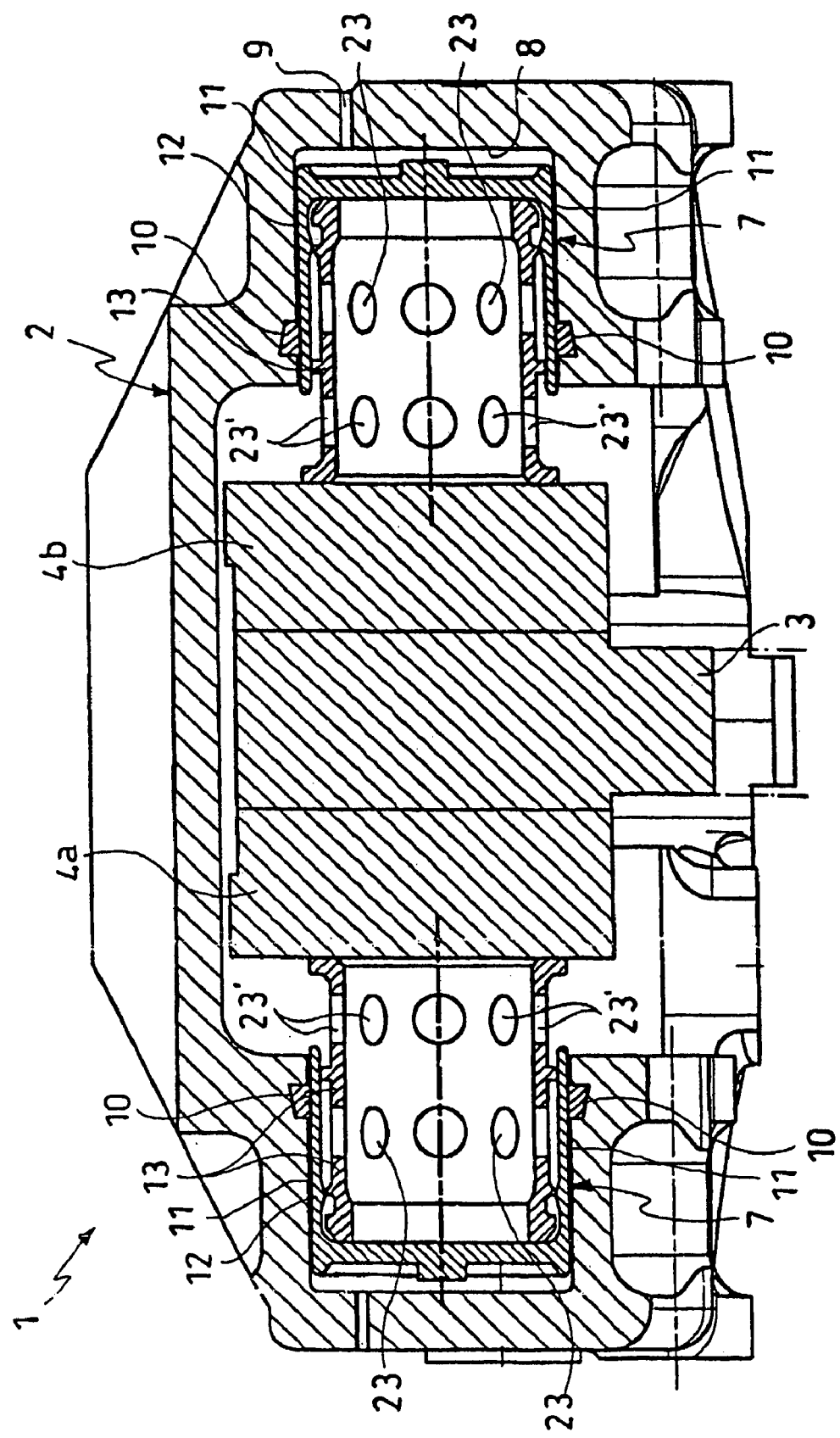

In particular, the present invention relates to a disk-brake piston (7) characterized in that it comprises a cup (12) having a skirt (14) and a head portion (15), and a tubular insert (13) housed in the cup, a space for cooling air being defined between the outer surface of the tubular insert (13) and the inner surface of the skirt (14) of the cup (12).

18 Claims, 4 Drawing Sheets

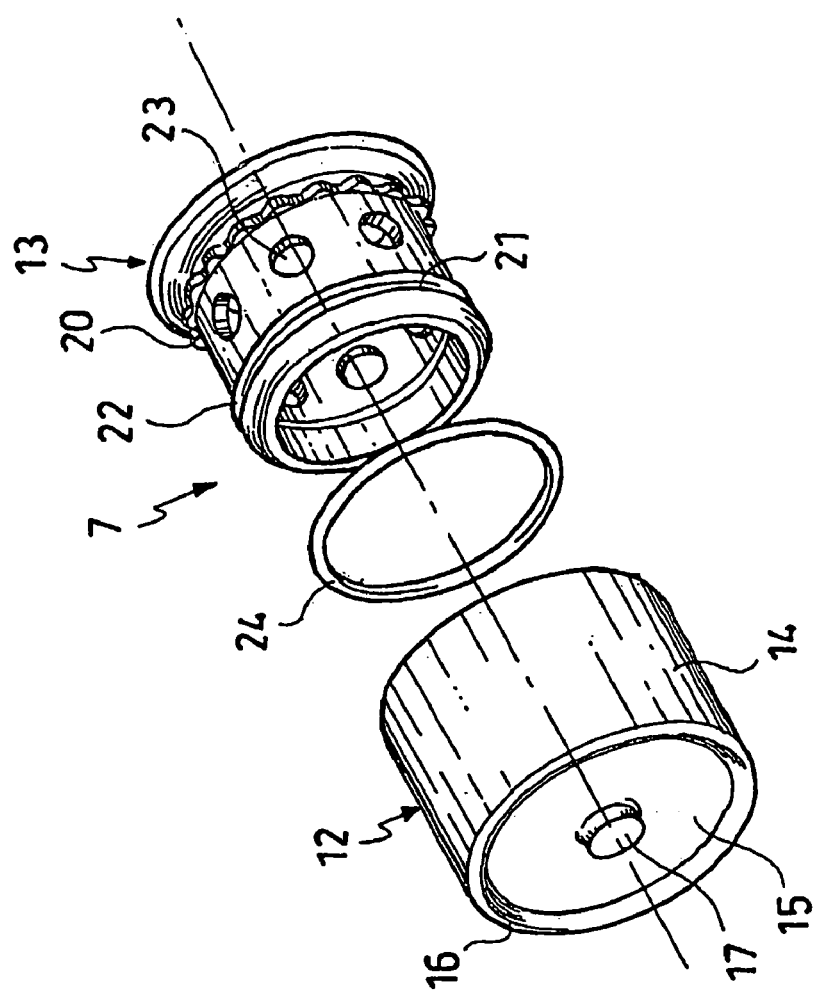
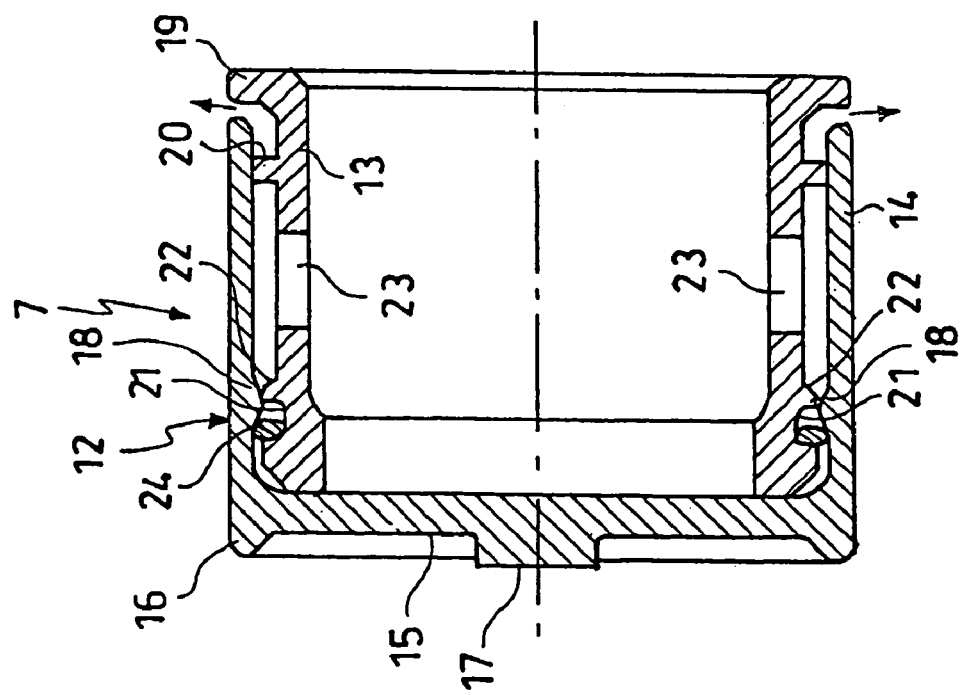
FIG. 3
FIG. 2

BRAKE PISTON

The present invention relates to a brake piston with reduced transmission of heat from the disk to the brake fluid.

As is widely known, during braking, any brake is subject, as a whole, to considerable heating owing to the dissipation of the vehicle's kinetic energy to an extent which is limited to the proportion due to the wheel with which the brake is associated. In disk brakes, this kinetic energy, a large part of which is converted into thermal energy because of the necessary friction during the braking operation, is stored mainly by the disk, from which it is then dissipated into the surrounding environment. However, an appreciable portion of the heat is also transmitted to the pads, from which it is transferred, by conduction, to the piston and from there, again by conduction, to the brake fluid.

Although, in the event of heavy or prolonged braking or in the event of repeated braking, it is not generally possible to eliminate an increase in the temperature of the brake fluid, it is essential that the brake fluid should not reach boiling point, since the braking effect would be completely eliminated by the formation of vapour in the braking system.

The problem of the transfer of heat from the pads to the pistons and to the brake fluid is experienced in particular in applications for sports cars, or even racing cars, and to an even greater extent with the use of carbon pads and disks which require relatively high temperatures to ensure optimal operating characteristics.

The problem underlying the present invention is therefore to prevent overheating of the brake fluid, even with heavy and prolonged use of the brake.

This problem is solved by a disk brake and by a piston as defined in the appended claims.

Figure 4:
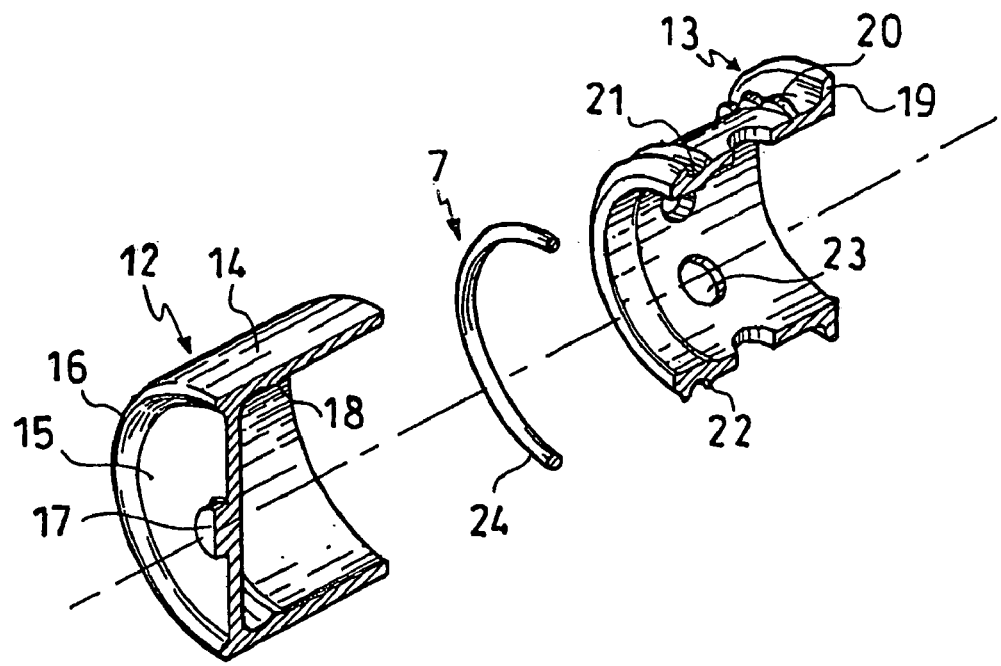
Figure 5:
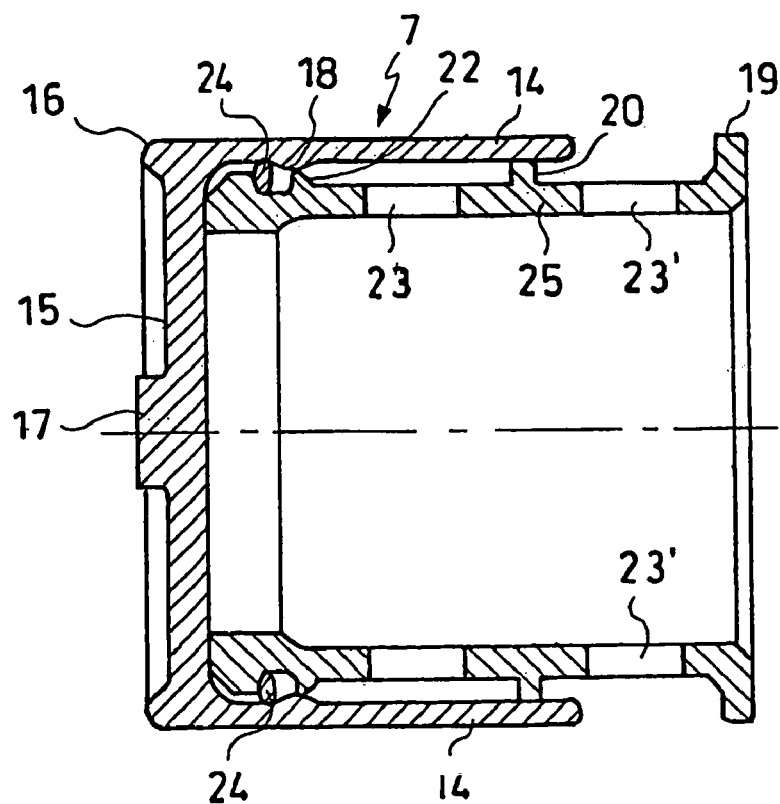
Figure 6:
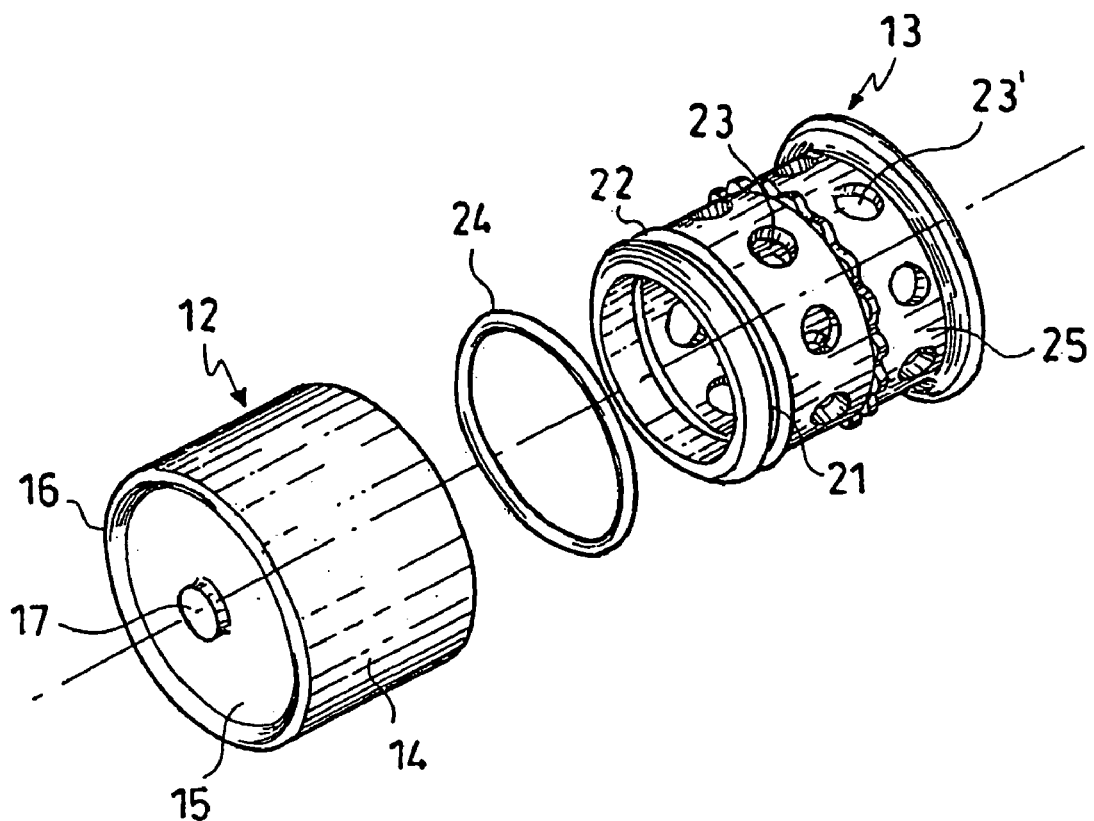
Figure 7:
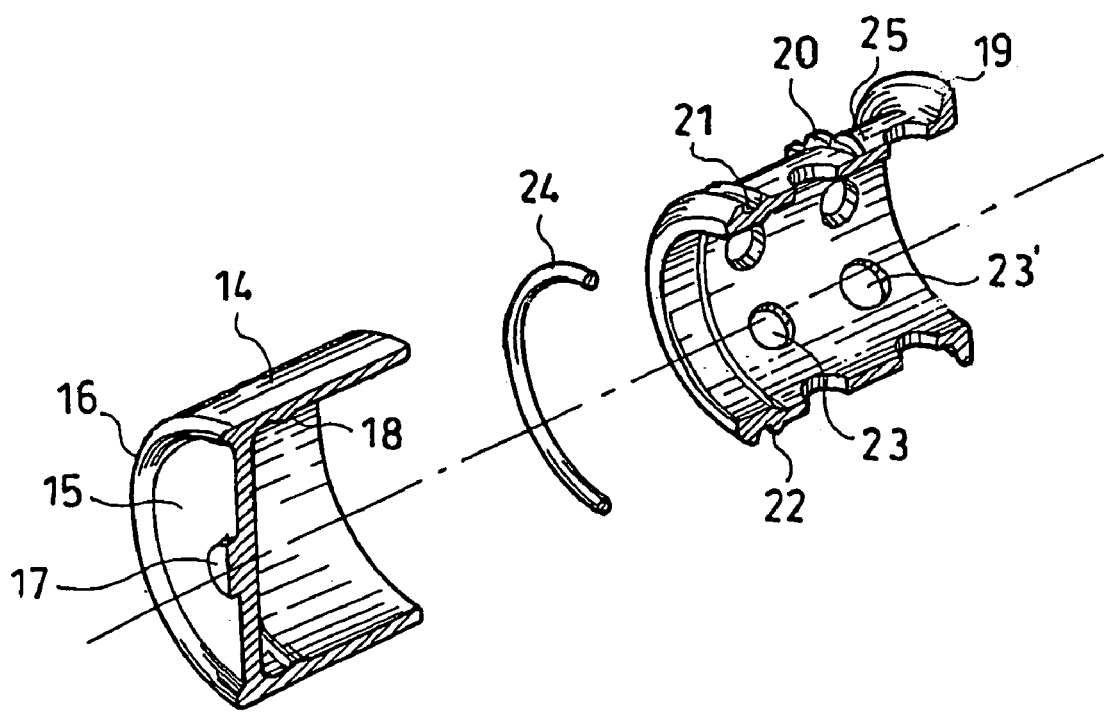

Further characteristics and advantages of the disk brake of the present invention will become clearer from the following description of some preferred embodiments thereof, given by way of non-limiting example with reference to the following drawings:

FIG. 1 shows, in section, a disk brake according to the present invention,

FIG. 2 shows, in section, the piston of the disk brake according to the present invention, FIG. 3 is an exploded perspective view of the piston of FIG. 2, FIG. 4 shows the piston of FIG. 3, sectioned in a diametral plane, FIG. 5 shows, in section, a second embodiment of the piston of the disk brake according to the present invention, FIG. 6 is an exploded perspective view of the piston of FIG. 5, and FIG. 7 shows the piston of FIG. 6, sectioned in a diametral plane.

The disk brake according to the present invention will now be described with reference to the drawings.

The disk brake, generally indicated 1, comprises a caliper 2 arranged astride a disk 3 (shown only partially in FIG. 1), and a pair of pads 4a, 4b on which respective pistons 7 act.

The pads 4a, 4b are made of material with a high coefficient of friction (for example, carbon pads) and are intended to engage the braking surfaces of the disk 3 during braking. Alternatively, each pad is composed of a metal plate facing the piston 7, with which it is in contact during braking, and of a lining facing the disk and made of material with a high coefficient of friction.

With so-called floating calipers (not shown in the drawings), the brake comprises a single piston which acts on one of the two pads.

The piston according to the present invention should be considered applicable to both of the above-described disk-brake types.

The piston 7 is housed for sliding in a respective cylinder 8 which is open on the side facing the plate and into which the brake fluid coming from the hydraulic equipment of the braking system is admitted through a duct 9. A sealing ring 10 ensures the leaktightness of the chamber 11 defined between the inner walls of the cylinder 8 and the outer walls of the piston 7.

The piston 7 comprises a cup 12 and an insert 13. The cup 12 has a hollow, substantially cylindrical shape, formed by a cylindrical skirt 14 and by a head portion 15 which closes the skirt at one end. The outside diameter of the piston 7 substantially corresponds to the inside diameter of the cylinder 8 so as to permit axial sliding of the piston. The head portion 15 has a projecting peripheral rim 16 and a central cylindrical element 17 which also projects, a recessed annular surface being defined between the rim 16 and the central element 17.

As shown best in FIG. 4, an annular rib 18 with slightly inclined sides and with a rounded ridge profile is defined on the inner surface of the skirt 14, in the vicinity of the connecting region between the skirt 14 and the head portion 15.

According to a preferred embodiment of the present invention, the thickness of the skirt 14 is less than the thickness of the head portion 15; most preferably, the thickness of the skirt 14 is approximately half of the thickness of the head portion 15.

The insert 13 is substantially tubular with an outside diameter smaller than the inside diameter of the cup 12 so that an annular space is created between the two surfaces. The insert 13 terminates in an outwardly-projecting flange 19 at one end and has a length such that, once the insert 13 is inserted in the cup 12 in abutment with the inner surface of the head portion 15, the flange 19 is arranged outside the cup 12 and, radially, substantially at the level of the outer surface of the skirt 14.

A ring of teeth 20, constituting radial spacing means between the insert 13 and the skirt 14, is disposed on the outer surface of the insert 13 in the vicinity of the flange 19 but in a position such as to be able to engage and slide on the inner surface of the skirt 14 of the cup 12 when the insert is inserted in the cup. The function of the ring of teeth 20, in addition to that of keeping the insert 13 spaced from the skirt 14, is to centre the insert. At the same time, the presence of teeth rather than, for example, a continuous rib, also permits improved air circulation to the exterior in the direction of the arrows in FIG. 2.

In the vicinity of its end remote from the flange 19, the insert 13 has a thicker portion in which an annular groove 21 is formed externally. The groove 21 comprises an outer wall, closer to the end of the insert which is to engage in abutment with the head portion 15 of the cup 12, and a facing, inner wall. The inner wall of the groove 21 is constituted by an annular projection 22 having a substantially rounded ridge profile. The annular projection 22 is positioned in a manner such that, when the insert 13 is inserted in the cup 12 in abutment with the inner surface of the head portion 15, the annular projection is aligned with the annular rib 18 of the skirt.

The outer edge of the thicker portion of the insert 13 is chamfered to prevent it from interfering with the inner surface of the connecting region between the skirt 14 and the head portion 15.

A plurality of through-holes 23 is formed in the insert 13, between the annular projection 22 and the ring of teeth 20, the holes being of dimensions such as to permit an efficient circulation of air between the interior of the insert 13 and the space between the insert and the skirt 14.

The piston 7 also comprises a resilient ring 24 made of resilient metal or constituted by a split ring. The diameter of the resilient ring 24 is such that it can be fitted in the annular groove 21—which constitutes its seat—so as to project radially farther outwards than the annular projection 22.

As shown in FIG. 2, the resilient ring 24 is intended to be housed in the annular groove 21, interfering with the inner surface of the skirt 14 of the cup 12 in the region disposed between the annular rib 18 and the region of connection with the head portion 15, and hence downstream of the rib 18, with reference to the direction of insertion of the insert 13 in the cup 12.

In a second embodiment of the piston 7, shown in FIGS. 5, 6 and 7, the insert 13 comprises a tubular connecting portion 25 between the ring of teeth 20 and the flange 19. This tubular connecting portion 25, which has the same diameter as the tubular insert 13, also has a plurality of through-holes 23' with the same function as the holes 23 described above.

The piston 7 is assembled by the insertion of the resilient ring 24 in the seat 21 and the subsequent introduction of the insert 13 into the cup 12, in abutment with the inner surface of the head portion 15 thereof. The resilient ring 24, which is deformed by interference with the annular rib 18 during insertion, then expands downstream thereof, constituting a means for snap-retaining the tubular insert 13 inside the cup 12. Since the material of which the resilient ring 24 is made is metal, the force to be imparted to the insert in order to remove it from the cup is considerable, requiring deformation of the resilient ring. It is thus clear that the tubular insert 13 is restrained firmly inside the cup 12, keeping the piston firmly assembled.

The piston 7 is then inserted in the brake cylinder 8 with the head portion 15 facing the base of the cylinder.

The advantages of the disk-brake piston according to the present invention are clear from the foregoing description.

In the first place, the presence of a space between the tubular insert 13 and the cup 12 permits the presence of a cushion of cooling air between the two surfaces, which constitutes a first insulation and heat-dissipation means.

In the second place, the fact that the tubular insert 13 projects from the cup 12 means that the cup does not come into contact with the brake pad, thus minimizing the direct transfer of heat from the pad to the brake fluid by conduction. In fact, the sole opportunity for thermal conduction is between the pad and the tubular insert 13 which in turn can transfer only a limited proportion of the heat to the cup 12 by conduction, by virtue of the fact that the contact surface between the insert and the cup is limited to the ring of teeth 20 and to the end surface of the insert which is in abutment with the head portion 15 of the cup 12. Since it is the outer surface of the cup which is directly in contact with the brake fluid, the arrangement described can substantially limit heating of the brake fluid.

Moreover, the provision of a ring of teeth 20 rather than a continuous projection favours replacement of the cushion of air which is present in the space between the tubular insert 13 and the cup 12, promoting the dissipation of the heat which tends to accumulate inside the piston.

Finally, the presence of the through-holes 23 in the body of the tubular insert 13 permits a circulation of cooling air from the hollow interior of the insert to the space between the insert and the cup and, from there, towards the exterior, as indicated by the arrows of FIG. 2. In this case, the dissipation of the accumulated heat is optimal.

The fact that the tubular insert can be inserted in the cup and comprises snap-retaining means has two clear advantages. In the first place—by virtue of the presence of the metal resilient ring 24—the retaining means described ensure firm and stable assembly of the piston. Moreover, the absence of welding between the cup and the tubular insert allows the insert to be removed—after the application of sufficient force—whenever it is necessary to disassemble the piston for maintenance or replacement operations.

The embodiment shown in FIGS. 5, 6 and 7 permits even more efficient heat dissipation since the greater axial length of the insert permits a larger spacing between the pad and the brake-fluid chamber. Moreover, the possibility of providing a second series of holes 23' tends to maximize the circulation of air inside the piston and to minimize the cross-section for thermal conduction.

Clearly, only some specific embodiments of the disk-brake piston according to the present invention have been described and a person skilled in the art will be able to apply thereto all modifications necessary to adapt them to particular applications without, however, departing from the scope of protection of the present invention.

For example, the ring of teeth 20 may be replaced by a continuous rib or by other means for spacing the surface of the insert from the inner surface of the skirt 14 of the cup 12.

The snap-retaining means may alternatively be constituted by other known snap means, for example, by teeth disposed on the surface of the insert and cooperating with a groove formed in the inner surface of the skirt 14 of the cup 12.

The through-holes 23, 23' may differ in number and shape, for example, they may be in the form of longitudinal or transverse slots.

The invention claimed is:

1. A disk-brake piston, comprising a cup having a skirt and a head portion, and a hollow tubular insert housed in the cup, the tubular insert comprising a plurality of through-holes for putting the hollow interior of the insert into communication with the space between the insert and the skirt of the cup, wherein a space for cooling air is defined between an outer surface of the tubular insert and an inner surface of the skirt of the cup.

2. A piston according to claim 1 in which the tubular insert comprises snap-retaining means for retaining the insert in the cup, the tubular insert being removable from the cup after the application of an adequate removal force.

3. A piston according to claim 2 in which the snap-retaining means comprise a resilient ring housed in an annular groove formed in the outer surface of the tubular insert and cooperating with an annular rib on the inner surface of the cup.

4. A piston according to claim 3 in which the resilient ring is made of metal or is a metal split ring.

5. A piston according to claim 1, in which the tubular insert comprises means for radially spacing of the surface of the insert from the skirt of the cup.

6. A piston according to claim 5 in which the means for radially spacing are a ring of teeth which define ducts for the circulation of air between the space between the insert and the skirt of the cup and an exterior of the piston.

7. A piston according to claim 1, the tubular insert projecting axially from the cup.

8. A piston according to claim 1, wherein said tubular insert further comprises a tubular connecting portion and means for radially spacing of the surface of the insert from the skirt of the cup, said tubular connecting portion being disposed between the means for radially spacing and an end of the tubular insert adapted to interfere with a disk-brake pad, the tubular connecting portion being intended to project at least partially from the cup.

9. A piston according to claim 8 in which the tubular connecting portion comprises a plurality of through-holes for putting the hollow interior of the tubular insert into communication with an exterior of the piston.

10. A disk-brake comprising at least one piston, said piston comprising a cup having a skirt and a head portion, said piston further comprising a hollow tubular insert housed in the cup, the tubular insert comprising a plurality of through-holes for putting the hollow interior of the insert into communication with the space between the insert and the skirt of the cup, wherein a space for cooling air is defined between an outer surface of the tubular insert and an inner surface of the skirt of the cup.

11. A disk-brake according to claim 10 in which the tubular insert comprises snap-retaining means for retaining the insert in the cup, the tubular insert being removable from the cup after the application of an adequate removal force.

12. A disk-brake according to claim 11 in which the snap-retaining means comprise a resilient ring housed in an annular groove formed in the outer surface of the tubular insert and cooperating with an annular rib on the inner surface of the cup.

13. A disk-brake according to claim 12 in which the resilient ring is made of metal or is a metal split ring.

14. A disk-brake according to claim 10, in which the tubular insert comprises means for radially spacing of the surface of the insert from the skirt of the cup.

15. A disk-brake according to claim 14 in which the means for radially spacing are a ring of teeth which define ducts for the circulation of air between a space between the insert and the skirt of the cup and the exterior of the piston.

16. A disk-brake according to claim 10, the tubular insert projecting axially from the cup.

17. A disk-brake according to claim 10, wherein said tubular insert further comprises a tubular connecting portion and means for radially spacing of the surface of the insert from the skirt of the cup, said tubular connecting portion being disposed between the means for radially spacing and an end of a tubular insert adapted to interfere with a disk-brake pad, the tubular connecting portion being intended to project at least partially from the cup.

18. A disk-brake according to claim 17 in which the tubular connecting portion comprises a plurality of through-holes for putting the hollow interior of the tubular insert into communication with an exterior of the piston.

* * * * *